United States Patent
Shi

(10) Patent No.: US 9,215,673 B2
(45) Date of Patent: Dec. 15, 2015

(54) RADIO FREQUENCY MODULE SUPPORTING MULTIPLE CARRIERS, BASE STATION AND CARRIER DISTRIBUTION METHOD

(71) Applicant: Huawei Technologies Co., LTD, Shenzhen (CN)

(72) Inventor: Rui Shi, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 47 days.

(21) Appl. No.: 13/946,517

(22) Filed: Jul. 19, 2013

(65) Prior Publication Data

US 2013/0301590 A1 Nov. 14, 2013

Related U.S. Application Data

(63) Continuation of application No. 13/725,314, filed on Dec. 21, 2012, now Pat. No. 8,503,327, which is a continuation of application No. PCT/CN2011/076811, filed on Jul. 4, 2011.

(51) Int. Cl.
*H04L 12/28* (2006.01)
*H04W 52/34* (2009.01)
*H04W 52/42* (2009.01)
*H04J 1/16* (2006.01)
*H04W 88/06* (2009.01)

(52) U.S. Cl.
CPC .......... *H04W 52/343* (2013.01); *H04W 52/346* (2013.01); *H04W 52/42* (2013.01); *H04W 88/06* (2013.01); *Y02B 60/50* (2013.01)

(58) Field of Classification Search
USPC ................... 370/252, 329, 430, 480
See application file for complete search history.

(56) References Cited

U.S. PATENT DOCUMENTS

| 4,761,796 | A | * | 8/1988 | Dunn et al. ................... 375/133 |
| 5,841,766 | A | * | 11/1998 | Dent .................. H04B 7/18534 370/321 |
| 7,504,976 | B1 | | 3/2009 | Pellon |

(Continued)

FOREIGN PATENT DOCUMENTS

| CN | 1859057 A | 11/2006 |
| CN | 1961514 A | 5/2007 |

(Continued)

OTHER PUBLICATIONS

Extended European Search Report received in Application No. 11858452.3-1855 mailed Mar. 18, 2014, 6 pages.

(Continued)

*Primary Examiner* — John Pezzlo
(74) *Attorney, Agent, or Firm* — Slater & Matsil, L.L.P.

(57) ABSTRACT

A radio frequency module supports multiple carriers includes a carrier generating apparatus, a carrier distributor, a carrier synthesizer, and at least two transmit channel. T carrier generating apparatus is connected to the carrier synthesizer, the carrier synthesizer is connected to the transmit channels, and the carrier distributor is separately connected to the carrier synthesizer and the transmit channels. According to embodiments of the present invention, the carrier distributor distributes a specified transmit channel for the multiple carrier signals according to power load capacity of each transmit channel and a total power of multiple carrier signals that need to be distributed.

21 Claims, 2 Drawing Sheets

(56) References Cited

U.S. PATENT DOCUMENTS

| | | |
|---|---|---|
| 8,503,327 B2 | 8/2013 | Shi |
| 2008/0198813 A1 | 8/2008 | Lu |
| 2010/0202392 A1 | 8/2010 | Zhang et al. |
| 2010/0272212 A1 | 10/2010 | Miyoshi et al. |
| 2011/0292887 A1 | 12/2011 | Baldemair et al. |
| 2012/0082125 A1 | 4/2012 | Huang |

FOREIGN PATENT DOCUMENTS

| | | |
|---|---|---|
| CN | 1964208 A | 5/2007 |
| CN | 101494863 A | 7/2009 |
| CN | 101925155 A | 12/2010 |
| CN | 102083184 A | 6/2011 |
| RU | 2166774 C2 | 5/2001 |
| WO | 03092231 A1 | 11/2003 |
| WO | 2005069274 A1 | 7/2005 |
| WO | 2010083324 A2 | 7/2010 |
| WO | WO 2011/046486 A1 | 4/2011 |

OTHER PUBLICATIONS

Chinese Search Report received in Chinese Application No. 2011800011941, mailed Jan. 25, 2013, 2 pages.

International Search Report received in International Application No. PCT/CN2011/076811, mailed Apr. 5, 2012, 12 pages.

\* cited by examiner

RADIO FREQUENCY MODULE SUPPORTING MULTIPLE CARRIERS, BASE STATION AND CARRIER DISTRIBUTION METHOD

CROSS-REFERENCE TO RELATED APPLICATIONS

This application is a continuation of U.S. patent application Ser. No. 13/725,314, filed on Dec. 21, 2012 and now U.S. Pat. No. 8,503,327 issued Aug. 6, 2013, which is a continuation of International Application No. PCT/CN2011/076811, filed on Jul. 4, 2011. The afore-mentioned patent applications are hereby incorporated by reference in their entireties.

TECHNICAL FIELD

Embodiments of the present invention relate to the field of communications technologies, and in particular, to a radio frequency module supporting multiple carriers, a base station, and a carrier distribution method.

BACKGROUND

With the increasingly high integration of mobile communication devices, it is required to achieve larger capacity and higher coverage capability at a unit cost. Multi-carrier, multiple-channel radio frequency module products for global system for mobile communications (GSM), universal mobile telecommunications system (UMTS), long term evolution (LTE) and code division multiple access (CMDA) become a trend. A radio frequency module that integrates large capacity and supports multiple carriers generally has the following features: supporting multiple carriers, for example, one module supports more than 2 carriers; supporting multiple modes, for example, supporting the GSM and the UMTS at the same time, supporting the GSM and the LTE at the same time, supporting the UMTS and the LTE at the same time, supporting the CDMA and the LTE at the same time, and so on; and supporting multiple channels, for example, both the UMTS and the LTE support the multiple-input multiple-output (MIMO) technology.

In the prior art, when a module with a large configuration capability is applied in a situation of non-full configuration, if a radio frequency module capable of supporting a large number of carriers is applied to bear a small number of carriers, a waste of a radio frequency channel occurs, for example, a certain radio frequency module supporting multiple carriers is capable of supporting 8 carriers at most, but actually bears only 4 carriers. In this case, bearing of 4 carriers is wasted. However, power consumption of the radio frequency module supporting multiple carriers in this situation is almost the same as that when 8 carriers are borne, resulting in a waste of power consumption and low efficiency of the radio frequency module.

SUMMARY OF THE INVENTION

Embodiments of the present invention provide a radio frequency module supporting multiple carriers, a base station, and a carrier distribution method to solve defects of a waste of power consumption and low efficiency of a radio frequency module in the prior art, thereby improving efficiency of a module with multiple carriers and saving energy.

An embodiment of the present invention provides a radio frequency module supporting multiple carriers, including a carrier generating apparatus, a carrier distributor, a carrier synthesizer, and at least two transmit channels. The carrier generating apparatus is connected to the carrier synthesizer and the carrier synthesizer is connected to the transmit channels. The carrier distributor is separately connected to the carrier synthesizer and the transmit channels.

The carrier generating apparatus is configured to generate multiple carrier signals.

The carrier distributor is configured to distribute, according to power load capacity of each transmit channel and a total power of multiple carrier signals that need to be distributed, a specified transmit channel for the multiple carrier signals, and send a distribution result to the carrier synthesizer.

The carrier synthesizer is configured to synthesize, according to the distribution result of the carrier distributor, the multiple carrier signals that are distributed to the specified transmit channel, and then send the synthesized signals to the specified transmit channel.

The transmit channels are configured to transmit the multiple carrier signals that are synthesized by the carrier synthesizer.

An embodiment of the present invention provides a base station, which includes any radio frequency module supporting multiple carriers according to the embodiments of the present invention.

An embodiment of the present invention provides a carrier distribution method. A carrier distributor distributes a specified transmit channel for the multiple carrier signals according to power load capacity of each transmit channel and a total power of multiple carrier signals that need to be distributed. A distribution result is sent to a carrier synthesizer. The carrier synthesizer synthesizes the multiple carrier signals that are distributed to the specified transmit channel according to the distribution result of the carrier distributor and then sends the synthesized signals to the specified transmit channel.

According to the radio frequency module supporting multiple carriers, the base station, and the carrier distribution method in the embodiments of the present invention, in a situation of non-full configuration, the carrier distributor distributes, according to the power load capacity of each transmit channel and the total power of the multiple carrier signals that need to be distributed, the specified transmit channel for the multiple carrier signals, thereby improving efficiency of a module with multiple carriers and saving energy.

BRIEF DESCRIPTION OF THE DRAWINGS

To describe technical solutions in the embodiments of the present invention or in the prior art more clearly, the accompanying drawings required in descriptions about the embodiments or the prior art are briefly described below. Apparently, the accompanying drawings described below illustrate only some embodiments of the present invention, and persons of ordinary skill in the art may still obtain other accompanying drawings from these accompanying drawings without creative efforts.

DETAILED DESCRIPTION OF ILLUSTRATIVE EMBODIMENTS

In order to make the objectives, technical solutions, and advantages of the embodiments of the present invention more comprehensible, the technical solutions in the embodiments of the present invention are clearly and completely described below with reference to the accompanying drawings. Apparently, the embodiments to be described are merely a part rather than all of the embodiments of the present invention. All other embodiments obtained by persons of ordinary skill in the art based on the embodiments of the present invention without creative efforts shall fall within the protection scope of the present invention.

Embodiment 1

Figure 1:
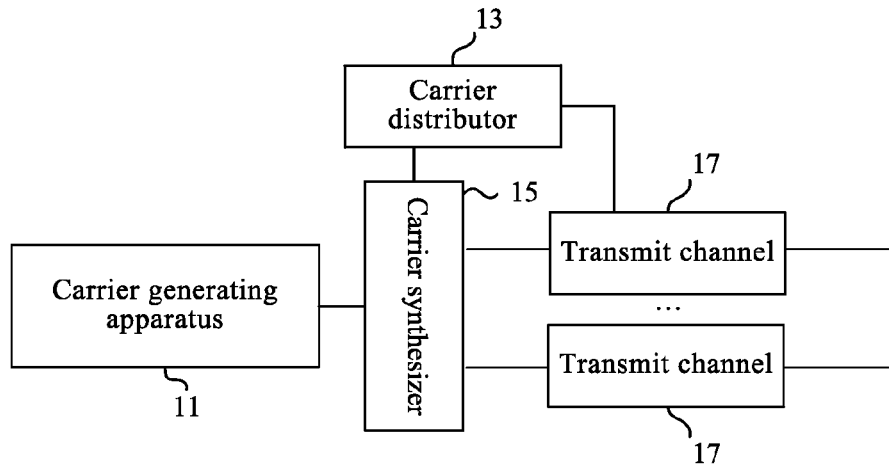
FIG. 1 is a schematic diagram of a radio frequency module supporting multiple carriers according to a first embodiment of the present invention.

FIG. 1 is a schematic diagram of a radio frequency module supporting multiple carriers according to a first embodiment of the present invention. As shown in FIG. 1, the radio frequency module supporting multiple carriers includes a carrier generating apparatus 11, a carrier distributor 13, a carrier synthesizer 15, and at least two transmit channels 17. The carrier generating apparatus 11 is connected to the carrier synthesizer 15, the carrier synthesizer 15 is connected to the transmit channels 17, and the carrier distributor 13 is separately connected to the carrier synthesizer 15 and the transmit channels 17. In this embodiment of the present invention, there are two or more transmit channels 17, and each transmit channel is separately connected to the carrier synthesizer 15 and the carrier distributor 13.

The carrier generating apparatus 11 is configured to generate multiple carrier signals, and a carrier mode of the multiple carrier signals may be any one or any combination of a GSM carrier, a UMTS carrier, an LTE carrier, and a CDMA carrier.

The carrier generating apparatus includes any one or any combination of a GSM carrier generator, a UMTS carrier generator, an LTE carrier generator, and a CDMA carrier generator.

The carrier distributor 13 is configured to distribute, according to power load capacity of each transmit channel 17 and a total power of multiple carrier signals that need to be distributed, a specified transmit channel 17 for the multiple carrier signals, and send a distribution result to the carrier synthesizer 15. In addition, the carrier distributor 13 may further be configured to deactivate an idle transmit channel 17. Specifically, in a situation of non-full configuration, the carrier distributor 13 may preferentially and centrally use one transmit channel 17, and after the power load capacity of the transmit channel 17 is used up, the carrier distributor 13 uses another transmit channel 17. In the process of distribution, if an idle channel to which no carrier is distributed is detected, the carrier distributor 13 may deactivate the idle transmit channel 17. Operations of distribution, activation, and deactivation by the carrier distributor 13 may be performed each time when carriers need to be re-distributed, or may be a dynamic process. Specifically, the power load capacity of each transmit channel 17 and a power of each carrier signal that needs to be distributed may be preset, or be acquired from a control command sent by a base station.

The carrier synthesizer 15 is configured to synthesize, according to the distribution result of the carrier distributor 13, the multiple carrier signals that are distributed to the specified transmit channel 17, and then send the synthesized signals to the specified transmit channel 17.

The transmit channels 17 are configured to transmit the multiple carrier signals that are synthesized by the carrier synthesizer 15. Specifically, when the carrier distributor 13 instructs that a certain transmit channel 17 be activated, the transmit channel 17 may transmit the multiple carrier signals that are synthesized and acquired from the carrier synthesizer 15; and when the carrier distributor 13 instructs that a certain transmit channel 17 be deactivated, the transmit channel 17 stops working.

For example, assuming that the radio frequency module supporting multiple carriers has two transmit channels and the carrier generating apparatus 11 generates a GSM carrier and an LTE carrier, in the situation of non-full configuration, the carrier distributor 13 distributes, according to the power load capacity of each transmit channel 17 and the total power of the multiple carrier signals that need to be distributed, a specified transmit channel 17 for the GSM carrier and the LTE carrier, and sends the distribution result to the carrier synthesizer 15, and the carrier distributor 13 deactivates another transmit channel 17 that is idle and not specified; and in this case, the carrier synthesizer 15 may synthesize, according to the distribution result of the carrier distributor 13, the GSM carrier and the LTE carrier, and then send the carriers to the specified transmit channel 17.

According to this embodiment, in the situation of non-full configuration, the carrier distributor distributes, according to the power load capacity of each transmit channel and the total power of the multiple carrier signals that need to be distributed, a specified transmit channel for the multiple carrier signals, thereby improving efficiency of a module with multiple carriers; and the carrier distributor may deactivate an idle transmit channel, thereby reducing the power consumption of the radio frequency module supporting multiple carriers and saving energy.

Embodiment 2

Figure 2A:
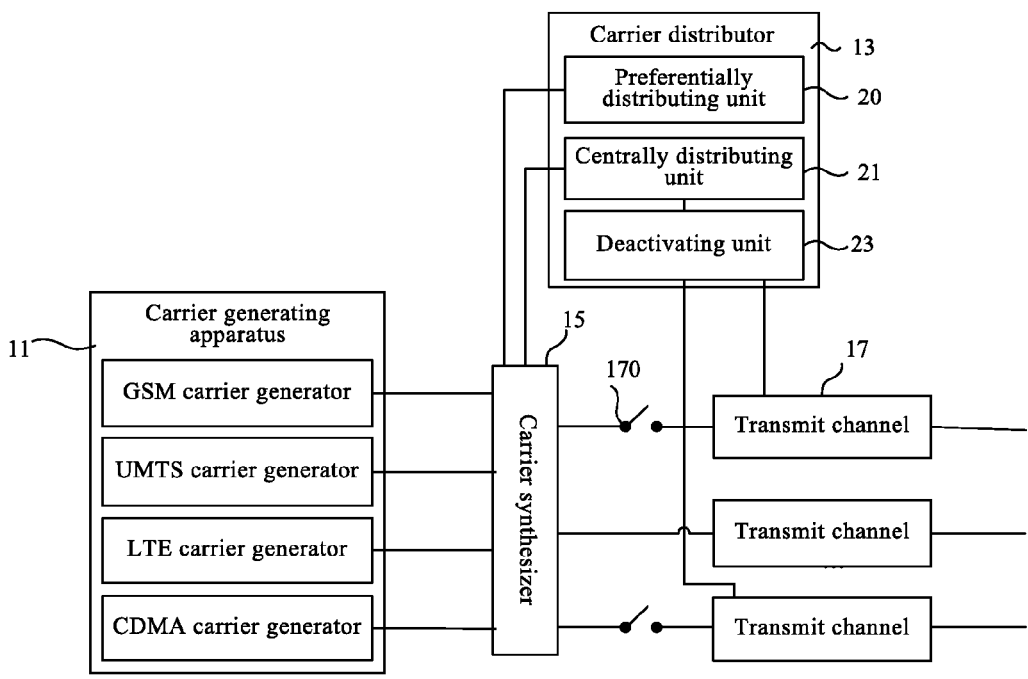
FIG. 2a is a schematic diagram of a radio frequency module supporting multiple carriers according to a second embodiment of the present invention.

FIG. 2a is a schematic diagram of a radio frequency module supporting multiple carriers according to a second embodiment of the present invention. As shown in FIG. 2a, referring to the first embodiment, a channel switch 170 may be set on the transmit channel 17 of the radio frequency module supporting multiple carriers based on the first embodiment, where the channel switch 170 is configured to activate or deactivate the transmit channel 17 according to an instruction of the carrier distributor 13. The channel switch 170 is controlled by the carrier distributor 13, and deactivates and activates an idle transmit channel 17 according to an instruction of the carrier distributor 13. Each transmit channel 17 may be connected to a corresponding channel switch 170, or one transmit channel 17 may not be set with a channel switch 170. In this case, the carrier distributor may include: a preferentially distributing unit 20, configured to set a transmit channel to an active state by default. The preferentially distributing unit 20 of the carrier distributor 13 may preferentially and centrally distribute multiple carrier signals to the transmit channel 17 that is in the active state by default.

The carrier distributor 13 may further include a centrally distributing unit 21, configured to centrally distribute the multiple carrier signals to the specified transmit channel 17 if power load capacity of the specified transmit channel 17 is higher than the total power of the multiple carrier signals; and preferentially and centrally distribute the multiple carrier signals to the specified transmit channel 17 and distribute the remaining carrier signals to another transmit channel 17 if the power load capacity of the specified transmit channel 17 is lower than the total power of the multiple carrier signals. For example, assume that the multiple carrier signals that are generated by the carrier generating apparatus 11 include a GSM carrier, a UMTS carrier, and an LTE carrier, where after the GSM carrier and the UMTS carrier are preferentially and centrally distributed to the specified transmit channel, the LTE carrier may be distributed to another transmit channel, and a deactivating unit 23, configured to, if it is detected that an idle transmit channel 17 to which no carrier is distributed exists after the carrier distribution, send an deactivation instruction to a channel switch 170 corresponding to the idle transmit channel 17. In this way, the channel switch may be instructed to deactivate the idle transmit channel, thereby reducing power consumption of the radio frequency module and saving energy.

Specifically, the multiple carrier signals in this embodiment of the present invention may include any one or any combination of a GSM carrier, a UMTS carrier, an LTE carrier, and a CDMA carrier; and the carrier generating apparatus 11 may include any one or any combination of a GSM carrier generator, a UMTS carrier generator, an LTE carrier generator, and a CDMA carrier generator.

Figure 2B:
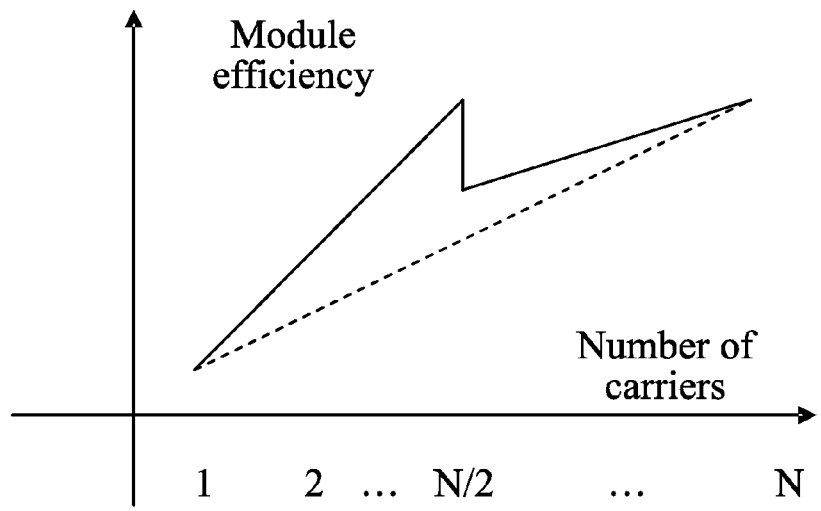
FIG. 2b is a schematic diagram of an effect of the radio frequency module supporting multiple carriers according to the second embodiment of the present invention.

FIG. 2b is a schematic diagram of an effect of the radio frequency module supporting multiple carriers according to the second embodiment of the present invention. As shown in FIG. 2b, assuming that the radio frequency module supporting multiple carriers has two transmit channels, the dashed line in the figure is a curve of efficiency of a radio frequency module in the prior art, and the solid line is a curve of efficiency of the radio frequency module after this embodiment of the present invention is adopted. It may be seen that in a situation of low configuration, the efficiency of the radio frequency module is improved significantly. In addition, power consumption of the radio frequency module is reduced greatly, for example: power consumption of four carrier signals of GSM S444, 20W/C that are distributed on two transmit channels is 17% higher than that of four carrier signals that are centrally distributed on one transmit channel with the other channel deactivated. The preceding curve diagram and data are for reference only, and based on different test and verification environments, an immaterial difference may exist between the acquired data and the experimental data that is provided in this embodiment of the present invention, that is, the two types of data may not be completely consistent with each other. Therefore, the schematic value and curve described here should not be construed as a limitation to the present invention and embodiments thereof.

According to this embodiment, in a situation of non-full configuration, the centrally distributing unit of the carrier distributor centrally distributes, according to the power load capacity of each transmit channel and the total power of the multiple carrier signals that need to be distributed, the multiple carrier signals to a specified transmit channel, thereby improving efficiency of a module with multiple carriers; and the carrier distributor may deactivate an idle transmit channel, thereby reducing the power consumption of the radio frequency module supporting multiple carriers and saving energy.

Embodiment 3

An embodiment of the present invention further provides a base station, including a radio frequency module supporting multiple carriers that is of any one of the structures in the preceding embodiments. In a situation of non-full configuration, a carrier distributor in the base station distributes, according to power load capacity of each transmit channel and a total power of multiple carrier signals that need to be distributed, a specified transmit channel for the multiple carrier signals, thereby improving efficiency of a module with multiple carriers; in addition, the carrier distributor in the base station may further deactivate an idle transmit channel, thereby reducing power consumption of the radio frequency module supporting multiple carriers and saving energy.

Embodiment 4

Figure 3:
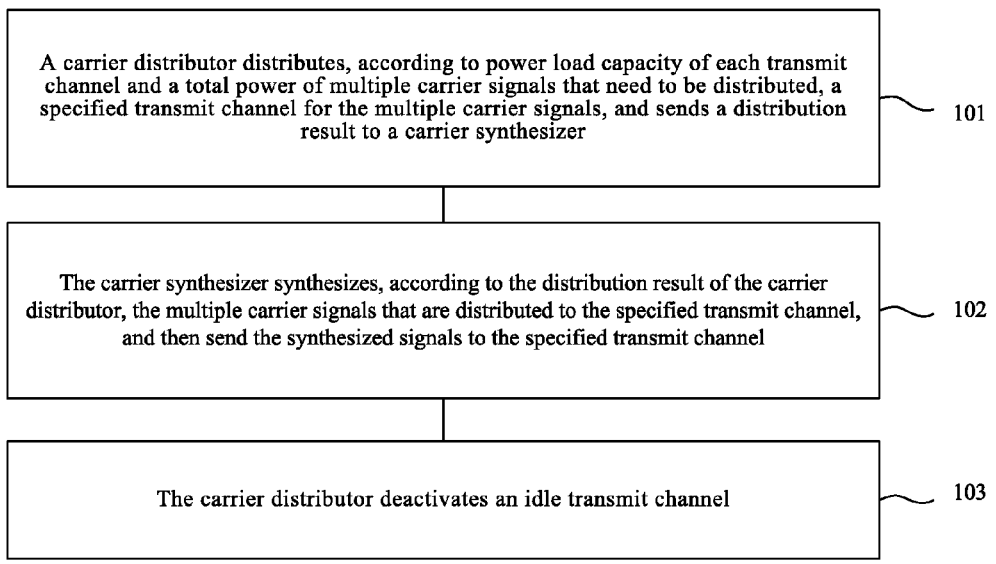
FIG. 3 is a schematic diagram of a carrier distribution method according to a fourth embodiment of the present invention.

FIG. 3 is a schematic diagram of a carrier distribution method according to a fourth embodiment of the present invention. As shown in FIG. 3, the carrier distribution method may be performed by a radio frequency module supporting multiple carriers that is of any one of the structures in the preceding embodiments, and may specifically include the following steps.

Step 101: A carrier distributor distributes, according to power load capacity of each transmit channel and a total power of multiple carrier signals that need to be distributed, a specified transmit channel for the multiple carrier signals, and sends a distribution result to a carrier synthesizer, where the distributing, by the carrier distributor according to the power load capacity of each transmit channel and the total power of the multiple carrier signals that need to be distributed, the specified transmit channel for the multiple carrier signals may specifically include the following situations:

situation 1: if the power load capacity of the specified transmit channel is higher than the total power of the multiple carrier signals, centrally distributing the multiple carrier signals to the specified transmit channel; and situation 2: if the power load capacity of the specified transmit channel is lower than the total power of the multiple carrier signals, preferentially and centrally distributing the multiple carrier signals to the specified transmit channel, and distributing the remaining carrier signals to another transmit channel.

Step 102: The carrier synthesizer synthesizes, according to the distribution result of the carrier distributor, the multiple carrier signals that are distributed to the specified transmit channel, and then send the synthesized signals to the specified transmit channel.

After step 102, the method may further include the following step.

Step 103: The carrier distributor deactivates an idle transmit channel.

Step 103 may be performed between step 101 and step 102, or performed after step 102. Its specific time sequence is not limited in this embodiment of the present invention. Step 103 may specifically include if it is detected that an idle transmit channel to which no carrier is distributed exists after the carrier distribution, sending, by the carrier distributor, a deactivation instruction to a channel switch corresponding to the idle transmit channel. In this way, the channel switch may be instructed to deactivate the idle transmit channel, thereby reducing power consumption of the radio frequency module and saving energy.

The multiple carrier signals in this embodiment of the present invention may include any one or any combination of a GSM carrier, a UMTS carrier, an LTE carrier, and a CDMA carrier.

In addition, one transmit channel may be set to an active state by default, and the carrier distributor preferentially and centrally distributes the multiple carrier signals to the transmit channel that is in the active state by default.

According to this embodiment, in a situation of non-full configuration, a centrally distributing unit of the carrier distributor centrally distributes, according to the power load capacity of each transmit channel and the total power of the multiple carrier signals that need to be distributed, the multiple carrier signals to a specified transmit channel, thereby improving efficiency of a module with multiple carriers; and the carrier distributor may deactivate an idle transmit channel, thereby reducing the power consumption of the radio frequency module supporting multiple carriers and saving energy.

Persons of ordinary skill in the art may understand that all or part of steps of the method according to the embodiments may be implemented by a program instructing relevant hardware. The program may be stored in a computer readable storage medium. When the program is executed, any part or all of the steps of the method according to the embodiments are performed. For example, the carrier distributor distributes, according to the power load capacity of each transmit channel and the total power of the multiple carrier signals that need to be distributed, the specified transmit channel for the multiple carrier signals, and sends the distribution result to the carrier synthesizer; the carrier synthesizer synthesizes, according to the distribution result of the carrier distributor, the multiple carrier signals that are distributed to the specified transmit channel, and then sends the synthesized signals to the specified transmit channel; the carrier distributor deactivates the idle transmit channel, and so on. The storage medium may be any storage medium capable of storing program codes, for example, a ROM, a RAM, a magnetic disk, or an optical disk.

Finally, it should be noted that the foregoing embodiments are merely provided for describing the technical solutions of the present invention, but not intended to limit the present invention. It should be understood by persons of ordinary skill in the art that although the present invention has been described in detail with reference to the embodiments, modifications can be made to the technical solutions described in the embodiments, or equivalent replacements can be made to some technical features in the technical solutions, as long as such modifications or replacements do not cause the essence of corresponding technical solutions to depart from the spirit and scope of the present invention.

What is claimed is:

1. A radio frequency module supporting multiple carriers, comprising:
   a carrier generating apparatus;
   a carrier distributor;
   a carrier synthesizer; and
   a plurality of transmit channels;
   wherein the carrier generating apparatus communicates with the carrier synthesizer, the carrier synthesizer communicates with the transmit channels, and the carrier distributor communicates with the carrier synthesizer and the transmit channels separately;
   wherein the carrier generating apparatus is configured to generate multiple carrier signals;
   wherein the carrier distributor is configured to distribute, according to power load capacity of each transmit channel and a total power of multiple carrier signals that need to be distributed, a specified transmit channel for the multiple carrier signals, and to send a distribution result to the carrier synthesizer;
   wherein the carrier synthesizer is configured to synthesize, according to the distribution result of the carrier distributor, the multiple carrier signals that are distributed to the specified transmit channel, and then to send the synthesized signals to the specified transmit channel;
   wherein the transmit channels are configured to transmit the multiple carrier signals that are synthesized by the carrier synthesizer; and
   wherein the power load capacity of each transmit channel and a power of each carrier signal that needs to be distributed are preconfigured or acquired from a control command sent by a base station.

2. The radio frequency module supporting multiple carriers according to claim 1, wherein the carrier distributor is further configured to deactivate an idle transmit channel after sending the distribution result to the carrier synthesizer.

3. The radio frequency module supporting multiple carriers according to claim 2, wherein a channel switch is set on the transmit channel, wherein the channel switch is configured to activate or deactivate the transmit channel according to an instruction of the carrier distributor.

4. The radio frequency module supporting multiple carriers according to claim 1, wherein a channel switch is set on the transmit channel, wherein the channel switch is configured to activate or deactivate the transmit channel according to an instruction of the carrier distributor.

5. The radio frequency module supporting multiple carriers according to claim 1, wherein the carrier distributor comprises a preferentially distributing unit, configured to set one transmit channel to an active state by default and to preferentially and centrally distribute the multiple carrier signals to the transmit channel that is in the active state by default.

6. The radio frequency module supporting multiple carriers according to claim 1, wherein the carrier distributor further comprises a centrally distributing unit, configured to centrally distribute the multiple carrier signals to the specified transmit channel when the power load capacity of the specified transmit channel is higher than the total power of the multiple carrier signals and to preferentially and centrally distribute the multiple carrier signals to the specified transmit channel and distribute remaining carrier signals to another transmit channel if the power load capacity of the specified transmit channel is lower than the total power of the multiple carrier signals.

7. The radio frequency module supporting multiple carriers according to claim 1, wherein the carrier distributor further comprises a deactivating unit, configured to send an deactivation instruction to a channel switch corresponding to an idle transmit channel to which no carrier is distributed when it is detected that the idle transmit channel exists after the carrier distribution.

8. The radio frequency module supporting multiple carriers according to claim 1, wherein the multiple carrier signals comprise any one or any combination of a GSM carrier, a UMTS carrier, an LTE carrier, and a CDMA carrier; and
   wherein the carrier generating apparatus comprises any one or any combination of a GSM carrier generator, a UMTS carrier generator, an LTE carrier generator, and a CDMA carrier generator.

9. A base station, comprising:
   a radio frequency module supporting multiple carriers, the radio frequency module supporting multiple carriers, the radio frequency module comprising:
   a carrier generating apparatus;
   a carrier distributor;
   a carrier synthesizer; and
   a plurality of transmit channels;
   wherein the carrier generating apparatus communicates with the carrier synthesizer, the carrier synthesizer communicates with the transmit channels, and the carrier distributor communicates with the carrier synthesizer and the transmit channels separately;

wherein the carrier generating apparatus is configured to generate multiple carrier signals;

wherein the carrier distributor is configured to distribute, according to power load capacity of each transmit channel and a total power of multiple carrier signals that need to be distributed, a specified transmit channel for the multiple carrier signals, and send a distribution result to the carrier synthesizer;

wherein the carrier synthesizer is configured to synthesize, according to the distribution result of the carrier distributor, the multiple carrier signals that are distributed to the specified transmit channel, and then send the synthesized signals to the specified transmit channel;

wherein the transmit channels are configured to transmit the multiple carrier signals that are synthesized by the carrier synthesizer; and wherein the power load capacity of each transmit channel and a power of each carrier signal that needs to be distributed are preconfigured or acquired from a control command sent by the base station.

10. The base station according to claim 9, wherein the carrier distributor is further configured to deactivate an idle transmit channel after sending the distribution result to the carrier synthesizer.

11. The base station according to claim 9, wherein a channel switch is set on the transmit channel, wherein the channel switch is configured to activate or deactivate the transmit channel according to an instruction of the carrier distributor.

12. The base station according to claim 9, wherein the carrier distributor comprises a preferentially distributing unit, configured to set one transmit channel to an active state by default, and to preferentially and centrally distribute the multiple carrier signals to the transmit channel that is in the active state by default.

13. The base station according to claim 9, wherein the carrier distributor further comprises a centrally distributing unit, configured to centrally distribute the multiple carrier signals to the specified transmit channel if the power load capacity of the specified transmit channel is higher than the total power of the multiple carrier signals and to preferentially and centrally distribute the multiple carrier signals to the specified transmit channel and distribute remaining carrier signals to another transmit channel if the power load capacity of the specified transmit channel is lower than the total power of the multiple carrier signals.

14. The base station according to claim 9, wherein the carrier distributor further comprises a deactivating unit, configured to send an deactivation instruction to a channel switch corresponding to an idle transmit channel to which no carrier is distributed when it is detected that the idle transmit channel exists after the carrier distribution.

15. The base station according to claim 9, wherein the multiple carrier signals comprise any one or any combination of a GSM carrier, a UMTS carrier, an LTE carrier, and a CDMA carrier; and wherein the carrier generating apparatus comprises any one or any combination of a GSM carrier generator, a UMTS carrier generator, an LTE carrier generator, and a CDMA carrier generator.

16. A base station, comprising:
a carrier distributor; and
a carrier synthesizer;
wherein the carrier distributor is configured to distribute a specified transmit channel for multiple carrier signals according to power load capacity of a plurality of transmit channels and a total power of multiple carrier signals that need to be distributed, the carrier distributor also configured to send a distribution result to the carrier synthesizer;

wherein the carrier synthesizer is configured to synthesize, according to the distribution result of the carrier distributor, the multiple carrier signals that are distributed to the specified transmit channel, and then send the synthesized signals to the specified transmit channel; and wherein the power load capacity of each transmit channel and a power of each carrier signal that needs to be distributed are preconfigured or acquired from a control command sent by the base station.

17. The base station according to claim 16, wherein the carrier distributor is further configured to deactivate an idle transmit channel after sending the distribution result to the carrier synthesizer.

18. The base station according to claim 16, wherein a channel switch is set on the transmit channel, wherein the channel switch is configured to activate or deactivate the transmit channel according to an instruction of the carrier distributor.

19. The base station according to claim 16, wherein the carrier distributor comprises a preferentially distributing unit, configured to set one transmit channel to an active state by default and to preferentially and centrally distribute the multiple carrier signals to the transmit channel that is in the active state by default.

20. The base station according to claim 16, wherein the carrier distributor further comprises a centrally distributing unit, configured to centrally distribute the multiple carrier signals to the specified transmit channel if the power load capacity of the specified transmit channel is higher than the total power of the multiple carrier signals and to preferentially and centrally distribute the multiple carrier signals to the specified transmit channel and distribute remaining carrier signals to another transmit channel if the power load capacity of the specified transmit channel is lower than the total power of the multiple carrier signals.

21. The base station according to claim 16, wherein the carrier distributor further comprises a deactivating unit, configured to send an deactivation instruction to a channel switch corresponding to an idle transmit channel to which no carrier is distributed when it is detected that the idle transmit channel exists after the carrier distribution.

* * * * *